United States Patent [19]
Wendt

[11] Patent Number: 5,180,987
[45] Date of Patent: Jan. 19, 1993

[54] DC-TO-AC SYMMETRICAL SINE WAVE GENERATOR

[75] Inventor: Rolf H. G. Wendt, Beaverton, Oreg.

[73] Assignee: NEC America Inc., Melville, N.Y.

[21] Appl. No.: 808,876

[22] Filed: Dec. 19, 1991

[51] Int. Cl.⁵ ............... H03B 28/00; H03B 19/00; H03K 3/02; H03K 4/02
[52] U.S. Cl. ........................... 328/14; 328/27; 328/186; 307/227
[58] Field of Search .............. 328/14, 27, 186; 307/227, 261, 268

[56] References Cited

U.S. PATENT DOCUMENTS

| | | | |
|---|---|---|---|
| 3,500,213 | 3/1970 | Ameau . | |
| 3,657,657 | 4/1972 | Jefferson | 307/261 |
| 3,713,137 | 1/1973 | Stone | 328/27 |
| 3,863,158 | 1/1975 | Kupersmith et al. | 328/27 |
| 3,992,680 | 11/1976 | Herzl . | |
| 4,056,692 | 11/1977 | Place . | |
| 4,061,909 | 12/1977 | Bryant . | |
| 4,239,941 | 12/1980 | Gauthier et al. | 328/27 |
| 4,368,432 | 1/1983 | Levy | 328/14 |
| 4,446,436 | 5/1984 | Ireland . | |
| 4,524,326 | 6/1985 | Larson . | |
| 4,710,890 | 12/1987 | Bailey . | |
| 4,727,570 | 2/1988 | Tarbouriech . | |
| 4,751,402 | 6/1988 | Hetyei . | |

Primary Examiner—William L. Sikes
Assistant Examiner—Sinh Tran
Attorney, Agent, or Firm—Sughrue, Mion, Zinn, Macpeak & Seas

[57] ABSTRACT

Many electronic systems such as telephone systems require highly accurate DC-to-AC signal generators such as sine wave generators. A sine wave generator according to the present invention includes a pair of multiplexers, each receiving a plurality of DC voltages from a voltage divider network and having a common output in a summing circuit to produce a sine wave at a predetermined frequency. The multiplexers are controlled by a single up/down counter element which drives the multiplexers to produce identical waveforms in each of the four quadrants of the sine wave. The sine wave frequency can be controlled by controlling a signal provided to the up/down counter.

12 Claims, 2 Drawing Sheets

DC-TO-AC SYMMETRICAL SINE WAVE GENERATOR

FIELD OF THE INVENTION

The present invention relates generally to sine wave generators. More specifically, the present invention relates to DC-to-AC sine wave generators providing a symmetrical low frequency output waveform. The present invention advantageously provides a sine wave having a frequency based on the rate at which DC signals are applied to the sine wave generator.

BACKGROUND OF THE INVENTION

Most DC-AC signal sources, such as ringing generators commonly used in telecommunication systems, require a stable, highly accurate sine wave signal source. A sine wave can be generated using logarithmic op-amps or other non-linear forms of signal integration, but sine waves generated in this manner generally have a noticeable amount of distortion. Sine waves can also be generated digitally using a relatively expensive digital to analog converter.

Sine wave generators using multiplexers or counters (and sometimes both) are known. U.S. Pat. No. 3,863,158, for example, discloses a multiplexer receiving 16 preset voltages, wherein a clock signal is used to drive the multiplexer to output the preset voltages to simulate a sine wave. On the other hand, U.S. Pat. No. 4,543,326 discloses a multiplexer having outputs connected to a resistor network. The multiplexer outputs are selected in response to signals from a five bit counter which counts in only one direction and which uses the most significant bit of the counter to determine the polarity of the output section of the sine wave.

Other methods for generating sine waves are disclosed in exemplary U.S. Pat. Nos. 3,500,213, 3,992,680, 4,056,692, 4,061,909, 4,368,432, 4,446,436, 4,710,890, 4,727,570 and 4,751,402.

U.S. Pat. No. 3,500,213, for example, discloses a sine wave synthesizer which employs an up/down counter connected to a decoder circuit. The output of the decoder circuit is provided to an amplifier via a D/A converter. Another exemplary patent, U.S. Pat. No. 3,992,680, discloses a precision frequency generator for producing a frequency proportional to flow rate. The frequency generator includes an oscillator coupled to a binary counter, which provides intermediate frequency pulses, which are a multiple of both the input and output frequencies. In particular, a switch connected between the output of the counter and a triangle generator, via a four-bit binary counter and a pair of gate logic units, is described. The triangle waveform is converted to a sine wave by a conventional converter.

Additionally, U.S. Pat. No. 4,056,692 discloses a digital tone generator including a pair of ring counters connected to a voltage divider network, from which the output signal is taken. In particular, a selection pad selects two signals having different frequencies, which are applied to a plurality of AND gates controlled by a pair of binary counters. The outputs of the pair of AND gates are provided to corresponding one shot multivibrators, which, in turn, control corresponding ring counters.

U.S. Pat. No. 4,061,909 discloses a variable waveform synthesizer including a binary counter driving a decoder network coupled to a plurality of current sources via a combining network of logic gates. Each of the current sources is connected via a summing resistor to an integrator, which produces the sine wave output by averaging the input pulses.

U.S. Pat. No. 4,368,432 discloses a sine wave generator including an oscillator, a frequency divider and a counter. The counter outputs are connected to a low pass filter via a resister network. U.S. Pat. No. 4,446,436 discloses an analog signal generating circuit employing a digital logic network to control a plurality of transistors connected to a multitap resistor, while U.S. Pat. No. 4,710,890 discloses a balanced mixer including an exclusive OR network connected to a plurality of resistors and driven by a Johnson counter.

Another method for generating waveforms is disclosed by U.S. Pat. No. 4,727,570, for example, wherein a waveform generator including a D/A converter driven by a pair of four bit counters is shown. In particular, the waveform generator counters are controlled by a logic gate responsive to frequencies produced by a column sine wave generator and a row sine wave generator. U.S. Pat. No. 4,751,402, on the other hand, discloses a complex signal generator using linear approximations including a counter coupled to a switching network via a binary to decimal decoder.

The present invention was motivated by a desire to produce a low frequency sine wave generator employing a small number of components but capable of producing a symmetrical low distortion waveform.

SUMMARY OF THE INVENTION

The principal object of the present invention is to provide a sine wave wherein the symmetry of the wave is maintained in each quadrant.

Another object of present invention is to provide a sine wave generator which can be produced at low cost.

Still another object of the present invention is to provide a sine wave generator which can be fabricated using a small number of components.

These and other object, features and advantages of the present invention are provided by a sine wave generator including a summing circuit receiving a plurality of voltages from a voltage divider via a pair of multiplexers responsive to a plurality of parallel bit sets generated by an up/down counter. The present invention is characterized in that the summing circuit outputs the voltages as voltages of a first polarity when the up/down counter counts from a predetermined number to a maximum number and when the up/down counter counts from the maximum number to the predetermined number and the summing circuit outputs the voltages as voltages of a second polarity when the counter counts from a minimum number to the predetermined number and when the counter counts from the predetermined number to the minimum number so as to permit the summing circuit to generate a sinusoidal signal in response to the parallel bit sets.

These and other objects, features and advantages of the present invention are provided by a sine wave generator including an up/down counter generating parallel bit sets, wherein each of the parallel bit sets includes n bits and a most significant bit and wherein each of the parallel bit sets corresponds to a respective count value in a range bounded by a minimum value and a maximum value, in response to a plurality of serial bits, a voltage divider network generating a plurality of predetermined voltages corresponding to a respective one of the n bits, first and second multiplexers operatively coupled to the up/down counter to receive the parallel bit sets and operatively connected to the voltage divider network to receive one of the predetermined voltages in response to the n bits of a respective one of the parallel bit sets, wherein one of the first and second multiplexers is enabled while the other of the first and second multiplexers is inhibited based on the most significant bit in each of the parallel bit sets. The sine wave generator further comprises a summing circuit operatively connected to the first and second multiplexers to receive the predetermined voltages in response to the parallel bits for producing first polarity voltages based on the predetermined voltages when the up/down counter counts from the minimum value to a predetermined value and from the predetermined value to the minimum value and for producing second polarity voltages based on the predetermined voltages when the up/down counter counts from the predetermined value to the maximum value and from the maximum value to the predetermined value so as to permit the summing circuit to produce a sinusoidal output signal.

According to one aspect of the present invention, the summing circuit includes a first amplifier operatively coupled to an output terminal of the first multiplexer, and a second amplifier operatively coupled to the second multiplexer and operatively coupled to the first amplifier. According to this aspect of the present invention, the first and second amplifiers are inverting amplifiers.

The present invention advantageously includes a filter coupled to the summing circuit for filtering the output of that circuit so as to produce a low distortion sinusoidal output signal.

These and other objects, features and advantages of the invention are disclosed in or apparent from the following description of preferred embodiments.

BRIEF DESCRIPTION OF THE DRAWINGS

The preferred embodiments are described with reference to the drawings in which.

DESCRIPTION OF THE PREFERRED EMBODIMENTS

Figure 1:
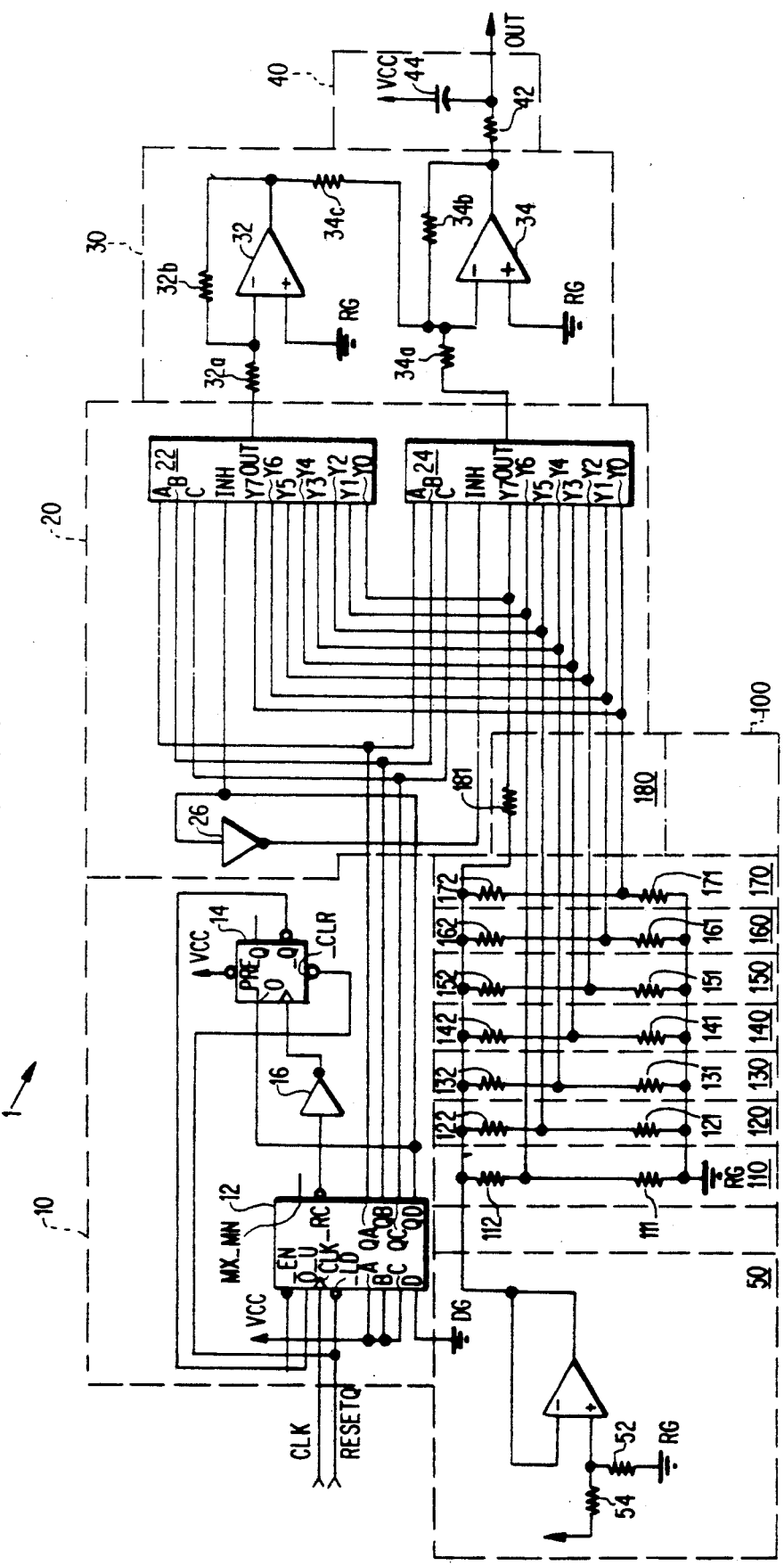
FIG. 1 is a schematic diagram of a sine wave generator according to the present invention.

FIG. 1 shows the preferred embodiment of a sine wave generator 1 according to the present invention, in which a counter circuit 10 is connected to a switching circuit 20, which is used to control application of a plurality of predetermined voltages to a summing circuit 30 producing an unfiltered sinusoidal output signal, as discussed in greater detail below. A filter circuit 40 advantageously can be connected to the output terminal of summing circuit 30 for filtering the unfiltered sinusoidal output signal to thereby provide a filtered sinusoidal output signal.

Preferably, the predetermined voltages are produced by a voltage divider network 100, which advantageously can receive a predetermined reference voltage from a power buffer circuit 50. The predetermined reference voltage advantageously is substantially equal to a maximum one of the predetermined voltages generated by voltage divider network 100.

Network 100 advantageously can comprise a resistive network including a plurality of branches 110, 120, 130, ..., 180 comprising one or more resistors (111, 112), (121, 122), (131, 132, ..., (181). It will be appreciated from FIG. 1 that network branch 180 advantageously includes only a single resistor. It will also be apparent that network 100 generates, in an exemplary case, eight predetermined voltages from the predetermined reference voltage.

Preferably, counting circuit 10 comprises a counter 12 receiving serial bits from an external serial bit source (not shown) and a bistable element 14 connected across counter 12. Most preferably, counter 12 is an up/down counter which provides a parallel bit set for each serial bit input to counter 12 while bistable element 14 is a flip-flop. Counter 12 advantageously counts from a minimum value to a maximum value and then from a maximum value to a minimum value in response to the serial bits and the output of bistable element 14. Preferably, the parallel bits generated by counter 12 include n bits and one most significant bit (MSB). Counter circuit 10 advantageously includes an invertor 16 serially connected between an output terminal RC of counter 12 and an input terminal of bistable element 14, which permits bistable element 12 to control the count direction of counter 12.

Switching circuit 20 advantageously comprises multiplexers 22 and 24, as well as an invertor 26. Preferably, multiplexers 22, 24 are 3-of-8 multiplexers which select one of eight possible input values for each possible value of n bits in the parallel bit sets. One of the multiplexers 22, 24 is enabled while the other is disabled in response to the MSB in each parallel bit set. It will be noted that an MSB input terminal INH of multiplexer 22 is serially connected to counter circuit 10 while that input terminal of multiplexer 24 is serially coupled to counter circuit 24 via invertor 26. It will be apparent that the logical value of the MSB applied to multiplexer 22 is the inverse of the logical value of the MSB applied to multiplexer 24.

As shown in FIG. 1, the voltage input terminals of multiplexers 22, 24 are connected to respective branches of network 100. It will be appreciated that branches 110, 120, 130, ..., 180 are connected to an inverted order.

Summing circuit 30 advantageously can include first and second amplifiers 32 and 34 for summing the output signals of multiplexers 22, 24, respectively, for producing an unfiltered sinusoidal output signal. The negative input terminal of amplifier 32, which includes resistors 32a and 32b, is serially connected to the output terminal of multiplexer 22. The negative input terminal of amplifier 34, which includes resistors 34a and 34b, is serially connected to the output terminal of multiplexer 24. Preferably, the output terminal of amplifier 32 is connected to the negative input terminal of amplifier 34 via a resistor 34c. It will be apparent to those skilled in the art that amplifiers 32, 34 are inverting amplifiers with unity gain factors. It will also be appreciated that the voltages provided by multiplexer 22 are inverted twice while those voltages output by multiplexer 24 are inverted only once. Thus, the output signal generated by summing circuit 30 has a first polarity when multiplexer 22 is enabled and a second polarity when multiplexer 24 is enabled.

Filter 40 advantageously can be serially connected with the output terminal of summing circuit 30 for filtering the generated output signal. Preferably, filter 40 is an RC network comprising resistor 42 and capacitor 44.

Preferably, power buffer 50 is an op-amp power buffer for increasing the current capability of an external voltage reference external source (not shown). Such power buffers are well understood by those of ordinary skill in the art and additional discussion of power buffer 50 will not be provided in the interest of brevity.

Figure 2A:
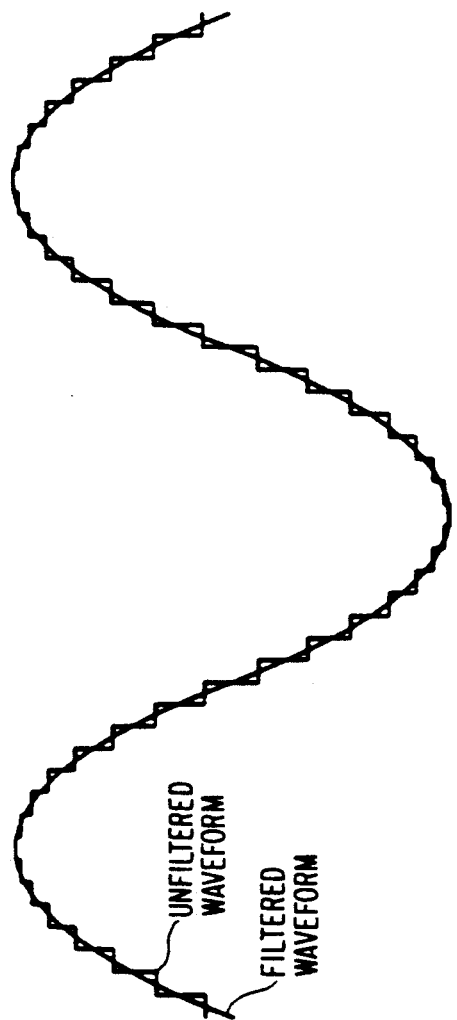
FIGS. 2a and 2b are illustrations of several waveforms which are useful in explaining the operation of the invention of FIG. 1.
Figure 2B:
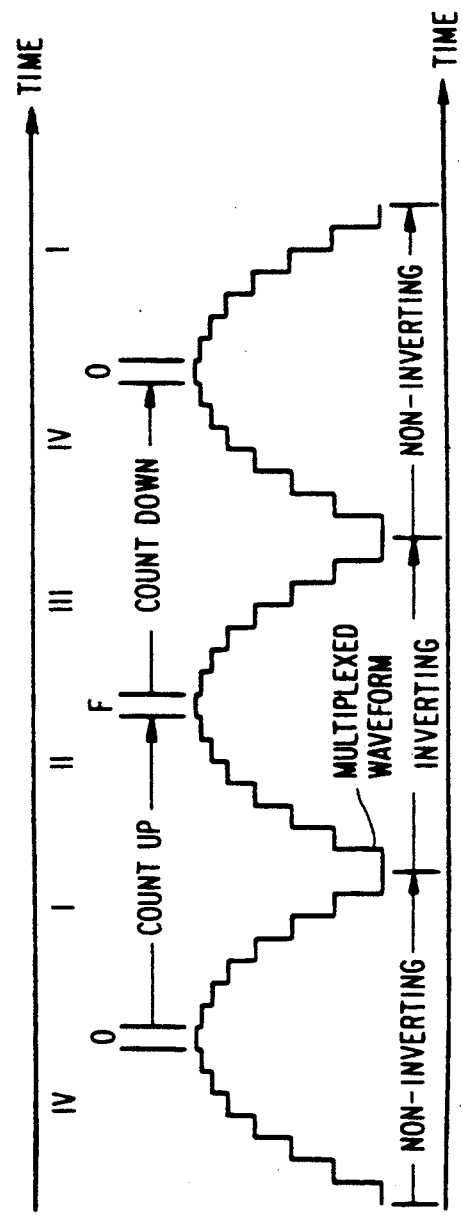

Before discussing the operation of sine wave generator a brief discussion of the principals underlying its operation will be provided while referring to FIG. 2.

As shown in curve (a) of FIG. 2, a sine wave can be separated into four symmetrical blocks. Beginning at the sine wave's peak voltage, the sine wave decreases in level towards zero. Each step in voltage would become incrementally larger as the time slope of the sine wave increases. This would determine the first time quadrant. During the second time quadrant, the level would continue to decrease towards its negative peak. This time, however, the incremental steps will become smaller in reverse order to those of the first time quadrant. Upon reaching the negative peak, the third time quadrant would begin increasing towards the positive sine wave peak, with each step again becoming incrementally larger with an equal progression to that of the first time quadrant. Note however, in the second and third time quadrants, the actual level is inverted. In the fourth time quadrant, the sine wave would continue to increase as it did in the second time quadrant (although with a positive level), until the positive peak value is again reached. When the various voltage values are rectified and plotted, as shown in Curve (b) of FIG. 2, the symmetry of each time quadrant with respect to the other time quadrants can be easily observed.

The operation of sine wave generator 1 will now be described while referring again to FIG. 1, in which counter 12 advantageously is a four bit up/down counter.

During the first time quadrant, counter 12 counts up in response to the serial bits applied to its input terminal CLK. Parallel bit set 0000 generated by counter circuit 10 applies the most positive voltage generated by network 100 to the non-inverting input terminal of summing circuit 30 via multiplexer 22. This most positive voltage corresponds to the positive peak voltage of the sine wave in the first time quadrant. The next most positive voltage is then applied to summing circuit 30 in response to parallel bit set 0001 generated by counting circuit 10, and so on. Once the parallel bit set 0111 is generated, the voltage level is very nearly zero volts.

When parallel bit set 1000 is generated by counting circuit 10, the non-inverting multiplexer 22 is inhibited and multiplexer 24, whose output is fed to the inverting input of the summing circuit 30, is enabled. As discussed above, the order of the predetermined voltages input to amplifier 34 via multiplexer 24 are reversed with respect to the order of the predetermined voltages input to amplifier 32 via multiplexer 22. In other words, voltage input terminal zero of multiplexer 22 receives the same input voltage as voltage input terminal 7 of multiplexer 24. As the count, which corresponds to the parallel bit sets, continues to increase, the voltages applied to summing circuit 30 become larger but the increments between voltages become smaller, i.e. the predetermined voltage applied to summing circuit 30 in response to count 1001 equals the voltage applied in response to count 0110. It will be noted that while the magnitudes of voltages corresponding to parallel bit sets 1001 and 0110 are equal, the polarity of the corresponding portions of the output signal generated by summing circuit 30 are inverted with respect to one another. This in effect reverses the trends of the first quadrant.

Once the parallel bit set is generated, which occurs when a negative peak value is obtained, counter circuit 10 begins to count down to produce the parallel bit sets in a reverse order and generates output voltages from summing circuit 30 in an inverse order with respect to the order with which these voltages are generated in the second and first quadrants, respectively. It will be noted that the enabled one of multiplexers 22, 24 will switch during the transition between parallel bit set 1000 and parallel bit set 0111, which corresponds to the zero crossing point of the sine wave. The output of the summing circuit 30 advantageously can be filtered to produce an accurate, smooth sine wave.

In an exemplary case, sine wave generator 1 was fabricated using a 74HC191 as counter 12 and a pair of 74HC4051 3-of-8 analog multiplexers as multiplexers 22, 24. The MSB of counter 12 selects one of the two multiplexers 22, 24. The multiplexer 22, which is responsive to parallel bit sets 0000–0111, was connected to the non-inverting input of summing circuit 30, while multiplexer 24, which is responsive to parallel bit sets 1000–1111, was connected to the inverting input of summing circuit 30. Eight predetermined voltages were applied to the voltage input terminals of multiplexers 22, 24. The multiplexer outputs were added by summing circuit 30, then filtered by filter 40. Prior to filtering, thirty different voltage steps were observed, representing the four quadrants each having eight steps, minus one extra clock cycle for each peak. The filtered output signal generated by filter 40 was a distortion-free 20 Hz 2.5 V peak voltage sinusoidal waveform.

Preferably, counter 12 includes a terminal LO for loading an intermediate starting count in counter 12. Thus, when a low level logic signal RESETQ is applied to terminal LO, counter 12 starts counting at a predetermined value. It will be appreciated that this permits sine wave generator 1 to generate the output sine wave starting with an output voltage value close to zero. It will also be noted from FIG. 1 that signal RESETQ advantageously can be applied to bistable element 14 so as to permit counter 12 to count in a predetermined direction when counting is started.

From the discussion above, it will be appreciated that the frequency of the sine wave can be controlled by changing the frequency or rate at which the serial bits are applied to terminal CLK of counter 12. Other similarly symmetrical waveforms can be created by adjusting the predetermined voltages generated by network 100.

It will also be appreciated that the sine wave generator according to the present invention can be produced at low cost. It will be further appreciated that the sine wave generator can be produced with a relatively small number of components owing to the use of a small number of branches in the voltage divider network and the application of the predetermined voltages produced by those branches in two different orders.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A sine wave generator including a summing circuit receiving a plurality of predetermined voltages from a voltage divider via a pair of multiplexers responsive to a plurality of parallel bit sets generated by an up/down counter, the number of said predetermined voltages corresponding to a maximum number represented by a predetermined number of bits included in a respective one of said parallel bit sets and each of said predetermined voltages being different from the remaining ones of said predetermined voltages, characterized in that said summing circuit outputs said predetermined voltages as voltages of a first polarity when said up/down counter counts from a predetermined number to a maximum number and when said up/down counter counts from said maximum number to said predetermined number and said summing circuit outputs said predetermined voltages as voltages of a second polarity when said counter counts from a minimum number to said predetermined number and when said counter counts from said predetermined number to said minimum number so as to permit said summing circuit to generate a sinusoidal signal in response to said parallel bit sets.

2. A sine wave generator comprising:
   an up/down counter for generating a plurality of parallel bit sets, wherein each of said parallel bit sets includes n bits where n is an integer and a most significant bit and wherein each of said parallel bit sets corresponds to a respective count value in a range bounded by a minimum value and a maximum value, in response to a plurality of serial bits;
   a voltage divider network generating a plurality of predetermined voltages, wherein the number of said predetermined voltages corresponds to a maximum number represented by said n bits and wherein each of said predetermined voltages is different from the remaining ones of said predetermined voltages;
   first and second multiplexers operatively coupled to said up/down counter to receive said parallel bit sets and operatively connected to said voltage divider network to receive one of said predetermined voltages in response to said n bits of a respective one of said parallel bit sets, wherein one of said first and second multiplexers is enabled while the other of said first and second multiplexers is inhibited based on said most significant bit in each of said respective parallel bit set; and
   a summing circuit operatively connected to said first and second multiplexers to receive said predetermined voltages in response to said parallel bits for producing first polarity voltages based on said predetermined voltages when said up/down counter counts from said minimum value to a predetermined value and from said predetermined value to said minimum value and for producing second polarity voltages based on said predetermined voltages when said up/down counter counts from said predetermined value to said maximum value and from said maximum value to said predetermined value so as to permit said summing circuit to produce a sinusoidal output signal.

3. The sine wave generator of claim 2, wherein said summing circuit comprises:
   a first amplifier operatively coupled to an output terminal of said first multiplexer; and
   a second amplifier operatively coupled to said second multiplexer and operatively coupled to said first amplifier.

4. The sine wave generator of claim 3, wherein said first and second amplifiers are inverting amplifiers.

5. The sine wave generator of claim 2, further comprising an inverter serially coupled between said up/down counter and said second multiplexer for inverting the value of said most significant bit in each of said parallel bit sets so as to permit said first multiplexer to receive said most significant bit and said second multiplexer to receive an inverted most significant bit.

6. The sine wave generator of claim 2, further comprising a filter serially connected to said summing circuit for receiving said sinusoidal signal and for producing a filtered sinusoidal signal.

7. The sine wave generator of claim 2, wherein said voltage divider network further comprises a plurality of branches, each of said branches including at least one resistor.

8. The sine wave generator of claim 2, wherein said first multiplexer outputs said predetermined voltages in a first order in response to said n bits, wherein said second multiplexer outputs said predetermined voltages in a second order in response to said n bits and wherein said first order is the opposite of said second order.

9. A sine wave generator generating a filtered sinusoidal output signal in response to a plurality of serial bits, said sine wave generator comprising:
   an up/down counter for generating a plurality of parallel bit sets in response to the serial bits, wherein each of said parallel bit sets includes n bits where n is an integer and a most significant bit and wherein each of said parallel bit sets corresponds to a respective count value in a range bounded by a minimum value and a maximum value;
   a voltage divider network comprising a plurality of branches, each of said branches including at least one resistor, for generating a plurality of predetermined voltages, wherein the number of said predetermined voltages corresponds to a maximum number represented by said n bits and wherein each of said predetermined voltages is different from the remaining ones of said predetermined voltages;
   a first multiplexer operatively coupled to said up/down counter to receive said parallel bit sets and operatively connected to said voltage divider network to receive said predetermined voltages in a first order in response to said n bits of said parallel bit sets;
   a second multiplexer operatively coupled to said up/down counter to receive said parallel bit sets and operatively connected to said voltage divider network to receive said predetermined voltages in a second order in response to said n bits of said parallel bit sets;
   a summing circuit operatively connected to said first and second multiplexers to receive said predetermined voltages in response to said parallel bit sets for producing first polarity voltages based on said predetermined voltages when said up/down counter counts from said minimum value to a predetermined value and from said predetermined value to said minimum value and for producing second polarity voltages based on said predetermined voltages when said up/down counter counts from said predetermined value to said maximum value and from said maximum value to said predetermined value so as to permit said summing circuit to produce a sinusoidal output signal; and a filter operatively connected to said summing circuit for receiving said sinusoidal output signal and generating said filtered sinusoidal output signal;

wherein one of said first and second multiplexers is enabled while the other of said first and second multiplexers is inhibited based on said most significant bit in each of said parallel bit sets.

10. The sine wave generator of claim 9, wherein said summing circuit comprises:

a first amplifier operatively coupled to an output terminal of said first multiplexer; and a second amplifier operatively coupled to an output terminal of said second multiplexer and operatively coupled to an output terminal of said first amplifier.

11. The sine wave generator of claim 10, wherein said first and second amplifiers are inverting amplifiers.

12. The sine wave generator of claim 9, further comprising an inverter serially coupled between said up/-down counter and said second multiplexer for inverting the value of said most significant bit in each of said parallel bit sets so as to permit said first multiplexer to receive said most significant bit and said second multiplexer to receive an inverted most significant bit.

* * * * *